UNITED STATES PATENT OFFICE 2,548,520

COPOLYMERS OF PROTEINS HAVING UNSATURATED RADICALS UNITED THEREWITH

Rudolph E. Damschroder and John W. Gates, Jr., Rochester, N. Y., assignors to Eastman Kodak Company, Rochester, N. Y., a corporation of New Jersey No Drawing. Application February 13, 1947, Serial No. 728,380

8 Claims. (Cl. 260—8)

This invention relates to high molecular weight materials prepared by copolymerizing proteins having unsaturated radicals chemically united therewith, with unsaturated polymerizable monomers or their partial polymerization products.

Materials prepared from natural polymers have been found valuable. For instance, cellulose derivatives, both esters and ethers have been found to be useful in the plastics arts. Alginic acid derivatives, zein and casein, have been found useful for many purposes where colloidal materials were desirable.

We have found that useful high molecular weight materials may be prepared by copolymerizing proteins, particularly gelatin, having unsaturated radicals with other unsaturated polymerizable monomers or their partial polymerization products. We have found for the first time that natural polymers of the protein type may enter into polymerization processes to form products having useful properties but in the nature of a large molecular compound. We have found that proteins containing unsaturated radicals combined therewith can be made to polymerize with vinyl compounds, acrylyl compounds, isopropenyl compounds as well as many other types of unsaturated monomers. We have also found that proteins containing unsaturated radicals combined therewith can be polymerized with partially polymerized compounds to form products of high molecular weight.

One object of our invention is to provide polymerized products having protein units combined therein. Another object of our invention is to provide a process in which proteins containing unsaturated radicals combined therewith are employed. A further object of our invention is to provide a process in which proteins containing unsaturated radicals combined therewith are copolymerized with unsaturated monomers or their partial polymers. A still further object of our invention is to provide products which are useful for use as colloidal materials in the photographic arts. Other objects of our invention will appear herein.

In its broadest aspects our invention involves the copolymerization of proteins having unsaturated radicals chemically united therewith, and unsaturated monomers or their partial polymers. The polymerization may be carried out by any of the known polymerizing methods including emulsion polymerization although ordinarily the use of an elevated temperature and a peroxide catalyst will satisfactorily promote the reaction.

The protein derivatives which are useful for preparing polymers in accordance with our invention are those in which an unsaturated polymerizable radical has united with the protein. For instance, methacrylyl gelatin may be prepared by reacting gelatin with methacrylic anhydride under alkaline conditions. If maleic anhydride or acrylic anhydride is employed, the radicals corresponding thereto combine with the gelatin. If styryl bromide is employed, styryl groups are united with the gelatin. Gelatins generally having polymerizable unsaturated radicals are suitable for use in accordance with our invention.

The unsaturated monomers which are copolymerized with gelatin derivatives may be any of the commonly known unsaturated monomers susceptible of entering into copolymerization reactions. Monomers which are particularly useful in accordance with our invention are vinyl, isopropenyl or acrylyl type compounds, such as vinyl acetate, vinyl chloride, vinyl methyl ether, acrylyl chloride, acrylic anhydride, methacrylic anhydride, acrylonitrile, isopropenyl acetate, methyl isopropenyl ketone, acrylamides, alkyl acrylates, alkyl methacrylates, styrene, and the like. Other unsaturated monomers, however, may be employed, such as maleic anhydride, butadiene, fumaronitrile, alkyl maleates, vinylidine dichloride, etc.

If desired, partially polymerized monomers may be employed instead of, or in addition to, the unsaturated monomers. For instance, a partially polymerized methacrylic anhydride or acrylic anhydride is polymerized with a protein containing an unsaturated radical combined therewith, such as methacrylyl gelatin. When a partially polymerized material is employed, that material should be one which has not been polymerized beyond solubility in the solvent employed in the polymerizing process. For instance, if water is employed as the solvent, the monomer used, if polymerized, should still retain water solubility.

If desired, various gelatins containing unsaturated radicals may be employed together, such as a mixture of methacrylyl gelatin and styryl gelatin. Proteins, other than gelatin and containing unsaturated radicals may also be employed, such as casein, zein, soy bean protein, edistin, castor bean proteins, and albumen united with methacrylyl or maleyl groups. If desired in polymerizations in accordance with our invention, a plurality of unsaturated monomers may be employed if desired.

The gelatin which is employed for our invention may be refined, such as employed in photography or other fine arts, unrefined, such as sold as glue, high or low viscosity, hydrolyzed or unhydrolyzed, deaminated or not, or, in fact, any type of gelatin which will combine chemically with unsaturated radicals. If desired, the polymer after being prepared may be hydrolyzed and/or its viscosity may be lowered if thought desirable.

Ordinarily the unsaturated protein derivative may be formed and then polymerized directly with the unsaturated monomer without separating from the mass in which it was prepared. However, the protein derivative may be prepared in a separate operation and employed when convenient. The following example illustrates the preparation of a gelatin derivative:

100 parts of dry gelatin were dissolved in 900 parts of water at 104–110° F. and the pH was adjusted to 9.5 by the addition of the required amount of alkali solution. 15 parts of methacrylic anhydride were then added in a dropwise manner, meanwhile holding the pH at 9.5 by the dropwise addition of alkali. The solution was stirred for fifteen minutes at 104° F. and the pH was adjusted to 5.5 with dilute sulfuric acid. The water was then evaporated off leaving a methacrylyl gelatin. This material can be employed directly in processes according to our invention or may be given a wash with cold water to remove the sodium sulfate present therein, if desired.

The following examples illustrate the preparation of polymers in accordance with our invention:

*Example 1.*—A 10% aqueous solution was prepared of methacrylyl gelatin at 40° C., the methacrylyl content of the gelatin being 10%. Methacrylic anhydride equal in weight to the dry gelatin derivative and benzoyl peroxide in an amount 10% of the weight of the dry weight of the gelatin derivative were also added. The mass was heated for one hour at 160° F. and was allowed to stand for thirteen hours. The resulting product was shredded and washed with hot water several times. The yield of the copolymer of methacrylyl gelatin and methacrylic anhydride was equal to the total weight of those materials which were employed in the polymerization.

*Example 2.*—25 parts of maleyl gelatin (10% maleyl) in 225 parts of water having a temperature of 104° F. and a pH of 5 were mixed with 25 parts of methacrylic anhydride and 2 parts of 30% hydrogen peroxide, and was warmed with stirring to 140° F. The copolymerization was completed in fifteen minutes. The resulting polymer was a white, opaque, water-insoluble solid of which a quantitative yield was obtained.

*Example 3.*—25 parts of methacrylyl gelatin (methacrylyl 5%) were dissolved in 225 parts of water at 100° F., the pH was adjusted to 6 and the solution was then treated with 12.5 parts of re-distilled, non-stabilized vinyl acetate and 1 part of 30% hydrogen peroxide at 104–110° F. with stirring. The temperature was slowly raised to 140° F. and held for fifteen minutes. The water-insoluble copolymer sets within a short time and may be shredded, washed and dried. The yield was approximately 35 parts of copolymer.

*Example 4.*—100 parts of dried gelatin were dissolved in 900 parts of water at 104–110° F., and the pH was adjusted to 9.5. This solution was treated dropwise with 15 parts of methacrylic anhydride, the pH being maintained at 9.5. The solution was stirred for fifteen minutes at 104° F., and the pH was adjusted to 5.5 with added sulfuric acid. 25 parts of re-distilled vinyl acetate were then added, and the temperature was raised to 130–135° F. with stirring. One part of hydrogen peroxide was added, and the temperature was raised to 150° F. and allowed to stand. Polymerization took place within thirty minutes.

*Example 5.*—20 parts of deaminated gelatin, as prepared by the method disclosed in Sheppard and Hudson application Serial No. 631,216, filed November 27, 1945, now abandoned, were dissolved in 180 parts of water at 104–110° F. and the pH was adjusted to 9.5. 4 parts of methacrylic anhydride were added in a dropwise manner, the pH being maintained at 9.5. After stirring for fifteen minutes, the pH was adjusted to 6.0 and the solution was treated with 10 parts of distilled vinyl acetate and ½ part 30% hydrogen peroxide and warmed to 140° F. The polymerization took place within an hour to give a clear, water-insoluble polymer. 30 parts of polymer were obtained.

*Example 6.*—10 parts of acrylyl gelatin in 190 parts of water at 120° F. were mixed with 5 parts of distilled vinyl acetate and ½ part of 30% hydrogen peroxide. The temperature was increased to 140° F. and maintained at that temperature for ½ hour. The copolymer formed set to a thick, water-insoluble gel.

*Example 7.*—50 parts of dried gelatin were dissolved in 450 parts of water at 104° F. The pH was adjusted to 9.5, and a solution of 3 parts of acrylyl chloride in 15 parts of dry acetone was added dropwise, the pH being held constant. After stirring for fifteen minutes, the pH was adjusted to 5.5 and 25 parts of distilled vinyl acetate and 1 part of 30% hydrogen peroxide were added. The temperature was raised to 140° F. and held at that temperature for fifteen minutes. The solution set to a tight, opaque, water-insoluble copolymer of vinyl acetate and acrylyl gelatin.

*Example 8.*—25 parts of maleyl gelatin were dissolved in 225 parts of water at 104° F., and the pH was adjusted to 5.5. There was then added to the solution 12.5 parts of distilled vinyl acetate and 1 part 30% hydrogen peroxide, and the solution was warmed to 140° F. with stirring. ½ hour heating at 140° F. completed copolymerization forming a water-insoluble polymer.

*Example 9.*—10 parts of methacrylyl gelatin were dissolved in 90 parts of water at 104° F., and the pH was adjusted to 5. 5 parts of acrylyl chloride and 0.5 part of 30% hydrogen peroxide were thoroughly mixed with the solution, and the mass was warmed to 150° F. and allowed to stand. A copolymer in the form of a white, opaque, solid formed in quantitative yield.

*Example 10.*—50 parts of dry gelatin were dissolved in 450 parts of water at 104° F. The pH was adjusted to 9.5 and 2.5 parts of acrylyl chloride were added dropwise while maintaining the pH constant. After this treatment 5 parts of methacrylic anhydride were added dropwise, the pH being held at 9.5. After this addition the pH was adjusted to 6 and 2 parts of 30% hydrogen peroxide were added. The temperature was then raised to 140° F. and the mass was allowed to stand. The resulting polymer was a clear, transparent, water-insoluble solid which could be sliced and dried. Without the peroxide treatment the gelatin remains water soluble.

*Example 11.*—10 parts of acrylyl gelatin were dissolved in 90 parts of water at 104° F., and the pH was adjusted to 6.5. 5 parts of methacrylic anhydride and 0.5 part of 30% hydrogen peroxide were stirred in. The solution was warmed to 160° F. and allowed to stand. The resulting copolymer was an opaque, water-insoluble solid.

*Example 12.*—5 parts of maleyl gelatin were dissolved in 95 parts of water at 100–120° F. The pH was adjusted to 6 and 2 parts of acrylyl chloride and a small amount of 30% hydrogen peroxide were added and the mass was warmed to 140° F. After standing over night, the polymer had set to a tight, water-insoluble solid that swells a great amount in water.

*Example 13.*—50 parts of dry gelatin were dissolved in 450 parts of water at 104° F. The pH was adjusted to 9.5, and 10 parts of methacrylic anhydride were added dropwise. The pH was then adjusted to 5.3 and 15 parts of methacrylic anhydride and 15 parts of distilled styrene and 2 parts of 15% hydrogen peroxide were added. The temperature was raised to 140° F. and copolymerization took place within ten minutes giving a water-insoluble, opaque, rubbery material.

*Example 14.*—50 parts of dry gelatin were dissolved in 450 parts of water at 104° F., and the pH was adjusted to 9.5 and 15 parts of methacrylic anhydride were added dropwise, the pH being held constant. The pH was then adjusted to 5.5 and there was mixed therewith 25 parts of distilled vinyl acetate, 25 parts of methacrylic anhydride and 2 parts of 30% hydrogen peroxide. The temperature was then raised during a period of 15 minutes to 140° F. Within ten minutes thereafter the copolymer had set to a tight, opaque, rubbery, water-insoluble material.

*Example 15.*—10 parts of casein in solution in 225 parts of water was adjusted to a pH of 10.5–11 and treated dropwise at 110° F. with 6 parts methacrylic anhydride. The pH was maintained at 10.5 by the addition of alkali. 30 parts of powdered gelatin were then added and the pH was adjusted to 10. 6 parts of methacrylic anhydride were added dropwise, the pH being held at 9.5–10. At the end of this treatment (fifteen minutes) the pH was adjusted to 6.5 and 10 parts of methacrylic anhydride, 5 parts redistilled styrene and 1 part of 30% hydrogen peroxide were added. The solution was warmed to 140° F., and the copolymerization takes place within thirty minutes to give a rubbery, opaque material.

*Example 16.*—100 parts of dry gelatin in 900 parts of water at 104° F. were adjusted to a pH of 9.5, and there was added thereto dropwise 10 parts of methacrylic anhydride dissolved in 50 parts of dry acetone. The pH was held constant. The pH was then adjusted to 5.5 and 30 parts of acrylonitrile and 2 parts of 30% hydrogen peroxide were added. The solution was heated with stirring to 140° F. for one hour and allowed to stand. The resulting copolymer was a clear, transparent, water-insoluble solid.

The copolymers in accordance with our invention may be hydrolyzed and thereby impart solubility thereto. These materials are quite useful as peptizing agents for the preparation of silver halides in order to form dispersions which are useful for photographic purposes. In some cases it may be preferred to form a silver halide emulsion using the protein copolymer as the protective colloid for the silver halide therein. These copolymers may be used for diazo-type materials or may be dichromate-sensitized whereby the copolymer is hardened when exposed to light.

The following examples illustrate the preparation of the hydrolyzed material:

*Example 17.*—50 parts of a copolymer prepared from 100 parts of dry gelatin, 15 parts methacrylic anhydride and 25 parts vinyl acetate were stirred for two hours at 120° F. with 500 parts of 5% aqueous sodium hydroxide. At the end of this time, the copolymer had dissolved and the solution was filtered and the pH adjusted to 4 with dilute sulfuric acid. Precipitation of the polymer began with a pH of 4.5 and was completed at 4 with the addition of a small amount of sodium sulfate. Approximately 10 parts of hydrolyzed copolymer were obtained.

*Example 18.*—100 parts of the powdered dry copolymer prepared from 200 parts dry gelatin, 30 parts of methacrylic anhydride and 100 parts of vinyl acetate were stirred for one-half hour at 130° F. with 750 parts 5% aqueous sodium hydroxide. The mass was filtered and the pH was adjusted to 4 by adding approximately 150 parts of 6 N sulfuric acid. The precipitation was completed by the addition of a small amount of sodium sulfate. The hydrolyzed copolymer was obtained as an oily, water-soluble material.

The materials of Examples 17 and 18 are useful as peptizing agents for preparing dispersed silver halides, particularly silver bromide, aqueous dispersions thus prepared being compatible with polyvinyl alcohol solutions to form polyvinyl alcohol-silver halide photographic emulsions.

The copolymers in accordance with our invention are useful for various purposes, particularly in the photographic art. For instance, they may be employed as a support for coating photographic emulsions thereon; as a carrier for dyes, for use as filters, as a hardening material, paper sizing or as a binding material for wood and other materials.

The following examples illustrate the preparation of sheets using these copolymers:

*Example 19.*—40 parts of dry gelatin were dissolved in 280 parts of water at 104° F., and the pH was adjusted to 9.5. 6 parts of methacrylic anhydride were added dropwise while maintaining the pH at 9.5. The solution was stirred for fifteen minutes at 104–110° F., the pH adjusted to 6.0, and then 3.2 parts glycerol and ⅙ part of polyethylene glycol (or some other wetting agent), 10 parts of distilled vinyl acetate and ½ part of 30% hydrogen peroxide was added. The temperature was raised to 120° F. over a period of fifteen minutes. The solution obtained was coated onto plates. Upon drying the copolymer sets to a clear, flexible sheet of uniform thickness.

*Example 20.*—40 parts of dry gelatin were dissolved in 260 parts of water at 104° F., and the pH was adjusted to 9.5. 6 parts of methacrylic anhydride were added dropwise while maintaining the pH at 9.5 by the addition of alkali. The pH was held at 9.5 for fifteen minutes and then adjusted to 6.0. At this point 6.4 parts of glycerol and 1.6 parts of wetting agent (polyethylene glycol) were added. The mass was then thoroughly mixed and then 30 parts of distilled vinyl acetate and 1 part 30% hydrogen peroxide was mixed therein. The temperature was raised to 120° F., the mass was stirred fifteen minutes and then coated to give a thin, flexible, transparent sheet of uniform thickness.

Impure forms of gelatin are also useful in preparing copolymers in accordance with our invention as illustrated by the following example using glue:

*Example 21.*—100 parts of dry glue in 200 parts of water at 110° F. were treated with 15 parts methacrylic anhydride; the pH was held to 9 and 10 by the use of alkali. After the addition was complete, the pH was adjusted to 5.5. ¼ of this batch was treated with 13 parts of vinyl acetate and 1.5 parts of 30% hydrogen peroxide heated to 130–140° F. for one hour. Smooth blocks of wood were coated with this polymer and pressed together until dry. The tensile strength of this seal was quite high. Another quarter of the original batch was treated with 13 parts of vinyl acetate and allowed to stand without adding the peroxide; no copolymerization took place.

The copolymers in accordance with our invention may be employed as a transparent water-permeable support in which photosensitive materials may be incorporated direct, such as adding an emulsion of silver bromide to a solution of gelatin derivative and monomer just previous to polymerization. Upon coating upon the heated film-forming surface, a sheet of insoluble transparent material containing dispersed silver halide is obtained which may be processed the same as conventional photographic emulsion.

We claim:

1. A method of preparing a high molecular weight material which comprises heating a mixture of methacrylyl gelatin and methacrylic anhydride.
2. A method of preparing a high molecular weight material which comprises heating a mixture of maleyl gelatin and methacrylic anhydride.
3. A method of preparing a high molecular weight material which comprises heating a mixture of methacrylyl gelatin and vinyl acetate.
4. A method of preparing a high molecular weight material which comprises heating methacrylyl gelatin with a monomer having a $CH_2=CH-$ group therein.
5. A method of preparing a high molecular weight material which comprises heating maleyl gelatin with a monomer having a $CH_2=CH-$ group therein.
6. A method of preparing a high molecular weight material which comprises heating a mixture of protein compound selected from the group consisting of methacrylyl protein, acrylyl protein, and maleyl protein with a monomer having a $CH_2=CR-$ group therein, R being a substituent selected from the group consisting of hydrogen and methyl.
7. A method of preparing a high molecular weight material which comprises heating acrylyl gelatin with a monomer having a $CH_2=CR-$ group therein, R being a substituent selected from the group consisting of hydrogen and methyl.
8. A method of preparing a high molecular weight material which comprises heating methacrylyl gelatin with acrylonitrile.

RUDOLPH E. DAMSCHRODER.
JOHN W. GATES, Jr.

REFERENCES CITED

The following references are of record in the file of this patent:

UNITED STATES PATENTS

| Number | Name | Date |
|---|---|---|
| 2,006,002 | Schneider | June 25, 1935 |
| 2,326,078 | Trommsdorff et al. | Aug. 3, 1943 |
| 2,336,985 | Freund | Dec. 14, 1943 |
| 2,343,011 | Huppert | Feb. 29, 1944 |
| 2,343,012 | Huppert | Feb. 29, 1944 |
| 2,399,084 | Watson | Apr. 23, 1946 |
| 2,420,736 | Coffman et al. | May 20, 1947 |

FOREIGN PATENTS

| Number | Country | Date |
|---|---|---|
| 532,674 | Great Britain | May 28, 1940 |

OTHER REFERENCES

Hackh's Chemical Dictionary, Blakeston, 1937, 2nd edition, pages 19 and 988.